United States Patent

Hippenmeyer et al.

[11] Patent Number: 5,838,478
[45] Date of Patent: Nov. 17, 1998

[54] ROTARY MIRROR ARRANGEMENT FOR THE FOCUSING OF AN INCIDENT LIGHT BEAM AND/OR CHANGING THE POSITION OF THE FOCUS OF AN ALREADY FOCUSED LIGHT BEAM

[75] Inventors: Heinrich Hippenmeyer, Freiamt; Christoph Anselment, Waldkirch/Breisgau, both of Germany

[73] Assignee: Sick AG, Waldkirch/Breisgau, Germany

[21] Appl. No.: 843,654

[22] Filed: Apr. 16, 1997

[30] Foreign Application Priority Data

Apr. 17, 1996 [DE] Germany .................. 296 06 966 U

[51] Int. Cl.⁶ .................................................. G02B 26/08
[52] U.S. Cl. .................... 359/198; 359/201; 359/205; 359/225
[58] Field of Search .............................. 359/198–201, 359/203–205, 208, 212, 216, 223–226, 850, 851, 862, 863, 868, 869, 871, 872

[56] References Cited

U.S. PATENT DOCUMENTS 5,183,350 2/1993 Kramer .
5,650,869 7/1997 Manhart et al. ................. 359/201

FOREIGN PATENT DOCUMENTS 20 41 217 1/1977 Germany .
27 14 494 2/1979 Germany .
8813348 U 12/1988 Germany .
2 016 635 9/1979 United Kingdom .

*Primary Examiner*—James Phan
*Attorney, Agent, or Firm*—Townsend and Townsend and Crew LLP

[57] ABSTRACT

A rotary mirror arrangement (10) for changing the focus of an already focused laser beam is characterized in that a plurality of deflecting mirrors (12) of different focal length are secured on one side of a base plate (14) which is rotatably journalled on a stationary latch plate (16) arranged on the opposite side and can be latched with the latter in various rotational positions. In a respective latch position, a relevant deflecting mirror (12) is pivoted into the beam path of the incident light beam (LS). The base plate (14) is displaceably journalled on the latch plate (16) in the direction of the axis of rotation (A) and is held against the latch plate by spring force (18). The base plate (14) is supported by a three-point mounting on the latch plate (16) The mounting includes, in particular, three ball-segment-like projections (20) which cooperate with a conical bore (22), a wedge-shaped groove (24), or a lower disposed section (26) of the latch plate (16) or of the base plate (14) in order to unambiguously and reproducibly fix the base plate (14) in the respective latched position,

15 Claims, 3 Drawing Sheets

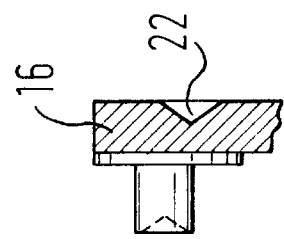
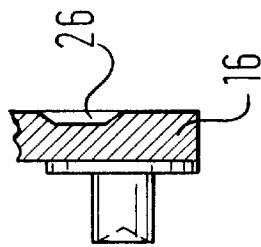
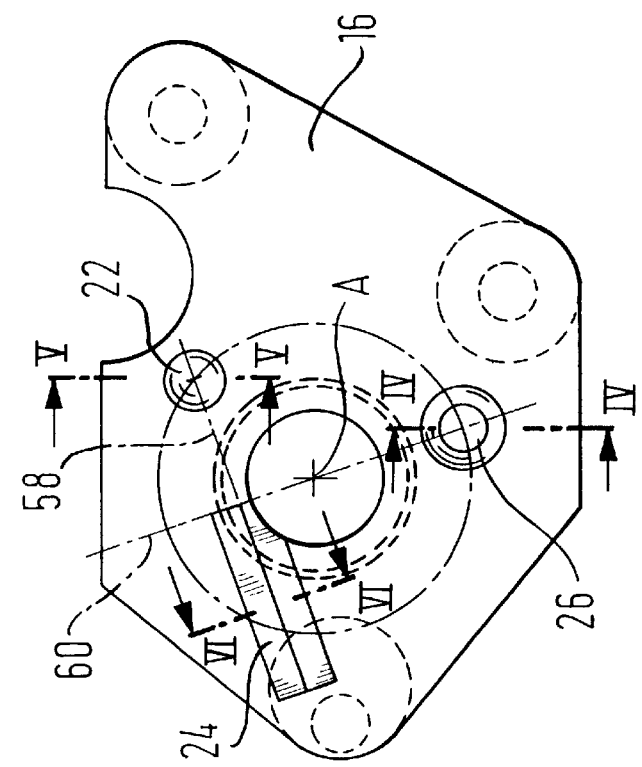
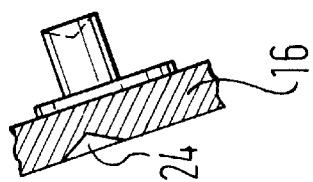

ROTARY MIRROR ARRANGEMENT FOR THE FOCUSING OF AN INCIDENT LIGHT BEAM AND/OR CHANGING THE POSITION OF THE FOCUS OF AN ALREADY FOCUSED LIGHT BEAM

TITLE OF THE INVENTION

Rotary mirror arrange meat for the focusing of an incident light beam and/or for changing the position of the focus of an already focused light beam, in particular of a laser beam.

FIELD OF THE INVENTION

The invention relates to a rotary mirror arrangement for the focusing of an incident light beam and/or for the changing of the position of the focus of an already focused light beam, in particular of a laser beam,

BACKGROUND OF THE INVENTION

In many practical applications it is desired to be able to change the focus of a light beam, in particular a laser

OBJECT OF THE INVENTION

The object of the invention is to provide a rotary mirror arrangement of the initially named kind with which an adjustment of the focus of this kind is possible in a simple and reliable manner.

BRIEF DESCRIPTION OF THE INVENTION

This object is satisfied by the invention in that a plurality of deflecting mirrors of different focal length are secured on one side of a base plate which is rotatably mounted on a stationary latch plate arranged on the opposite side and can be latched to the latter in various rotational positions, wherein, in a respective latched position, a relevant deflecting mirror is pivoted into the beam path of the incident light beam; in that the base plate is displaceably mounted on the latch plate in the direction of the axis of rotation and is held against the latch plate by spring force; and in that the base plate is supported on the latch plate by a three-point mounting which includes, in particular, three ball-segment-like projections which cooperate with a conical bore, a wedge-shaped groove, or a lower disposed section of the latch plate or of the base plate in order to unambiguously and reproducibly fix the base plate in the respective latched position.

Accordingly, the respectively desired focus is set in that the base plate serving as a mirror carrier is rotated until the respective latched position is reached in which the deflecting mirror having the relevant focal length has been swung into the beam path of the incident light beam. The precise positioning and alignment of the respective deflecting mirror is ensured by the three-point mounting of the base plate, by which the latter is fixed relative to the latch plate in the respective latched position.

In a respective latched position of this kind, the ball-segment-like projections or knobs provided at the base plate or at the latch plate are pressed, as a result of the spring force, into the conical bore and into the conical groove or against the lower disposed section of the latch plate or of the base plate. When setting or selecting the respective latched position, a point of rotation is defined by the conical bore which receives a respective ball-segment-like projection, about which the base plate is pivotable until a further ball-segment-like projection engages into the conical groove, whereby the rotary position of the base plate is defined relative to the latch plate. The plane in which the base plate comes to lie is defined in that the base plate finally also contacts the lower disposed section of the latch plate via the third ball-segment-like projection. An inverted arrangement with the knobs on the latch plate and the conical bore, truncated cone-like bore and wedge-shaped groove on the base plate is also possible. In this inverted arrangement the third knob then comes into contact with the recessed wall of the truncated cone-like bore in the base plate.

The base plate is then held by the spring force in the latch position which has been reached. Thus, even with a floating mounting of the base plate, a precise positioning and alignment of the mirror is always ensured. The respective positions and adjustments of the deflecting mirrors are thus reproducible at any time.

A circuit board can be fixedly connected to the stationary latch plate. A contact spring which is preferably rotatable with the base plate is held against this circuit board in order to be able to tap off a signal representative for the respective latched position of the base plate.

In accordance with a preferred embodiment, the deflecting mirrors are adjustable in their position relative to the base plate for an adjustment in the beam path of the light beam. In this respect, the deflecting mirrors are advantageously respectively fixed to the base plate via a flexible sheet metal holder of a preferably soft metal, such as in particular aluminium, and are fixed in the respectively set position by a removable fixing plate.

Further advantageous embodiments of the mirror arrangement of the intention are vat forth in the subordinate claims.

BRIEF DESCRIPTION OF THE DRAWINGS

The invention will be explained in more detail in the following with reference to an embodiment and to the drawings in which shown.

DESCRIPTION OF THE PREFERRED EMBODIMENT

Figure 1:
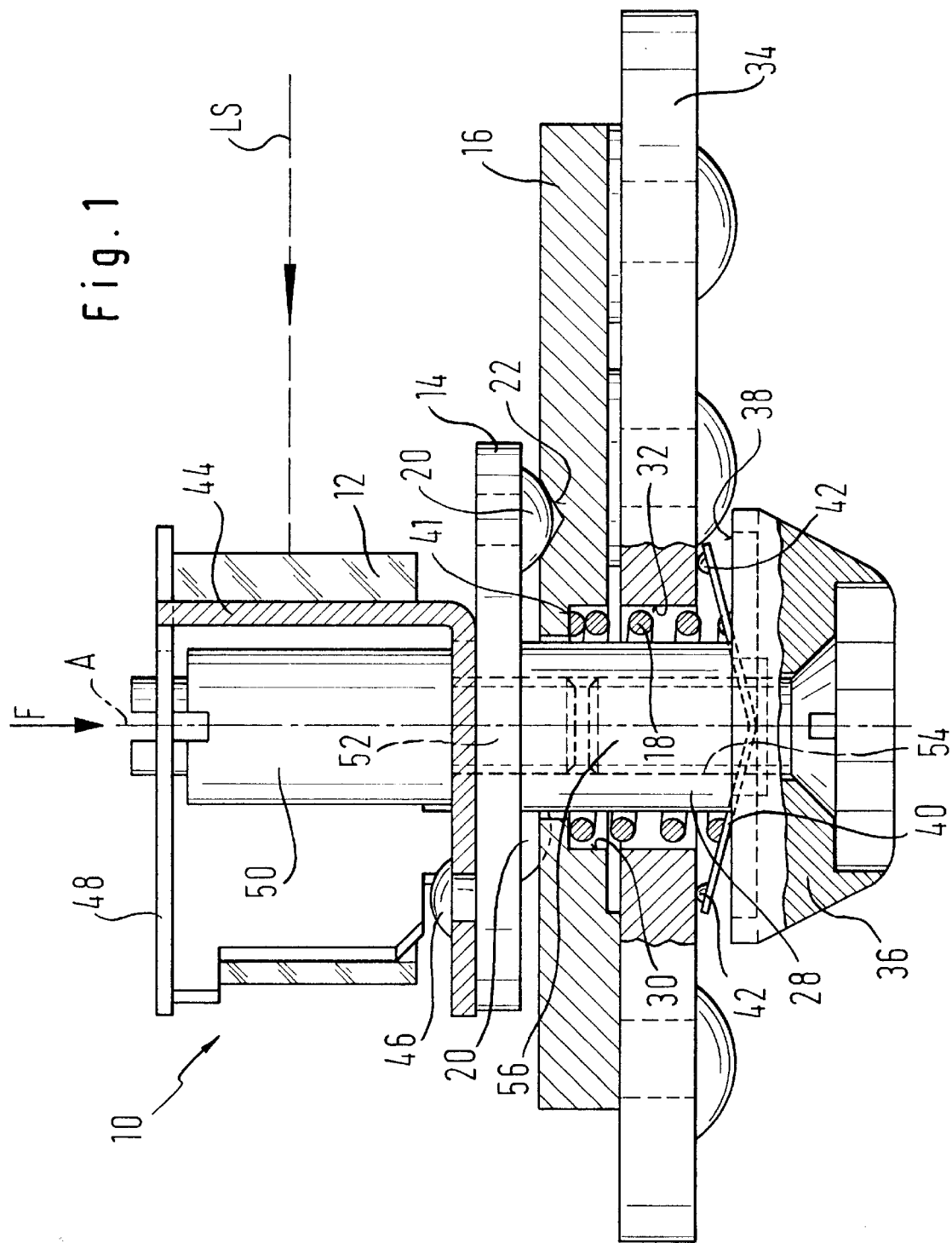
FIG. 1 a schematic partly sectioned illustration of a rotary mirror arrangement for the focusing of an incident laser beam, FIG. 2 a plan view of the rotary mirror arrangement shown in FIG. 1 in the direction of the arrow F of FIG. 1, FIG. 3 plan view corresponding to FIG. 2 of the latch plate with the base plate removed, FIG. 4 a section along the line A–B of FIG. 3 through the region of the latch plate having the truncated conical bore, FIG. 5 a section along the line C—C of FIG. 3 through the region of the latch plate having the conical bore, and FIG. 6 a section along the line E–F of FIG. 3 through the region of the latch plate having the wedge-shaped groove.

In FIGS. I and 2 there is shown an embodiment of a rotary mirror arrangement 10 for the focusing of an incident light beam, here of a laser beam LS.

This rotary mirror arrangement 10 includes three deflecting mirrors 12 of different focal length which are secured on one side of a base plate 14. The base plate 14 is rotatably journalled on a stationary latch plate 16 arranged on the opposite side of the base plate from the mirrors and can be latched to the latter in three different rotary positions. In a respective latched position of the base plate 14 a relevant deflecting mirror 12 is swung into the beam path of the incident laser beam LS.

The base plate 14 is journalled on the latch plate 16 so that it is displaceable in the direction of the axis of rotation A and is held by the force of the compression spring 18 against the latch plate. In this arrangement the base plate 14 is supported by a three-point mounting on the latch plate 16. This three-point mounting includes three ball-segment-like projections 20 arranged on the base plate 14 on a circle concentric to the axis of rotation A and respectively displaced by 120° relative to one another.

These three ball-segment-like projections or knobs 20 cooperate with a conical bore 22, a wedge-shaped groove 24 and a truncated cone-like bore 26 of the latch plate 16 forming a lower disposed section or wall (see in particular also FIGS. 3 to 6), whereby the base plate 14 is fixed in the respective latched position.

As can best be recognised with respect to FIG. 1, the base plate 14 is provided with a rotary spigot 28 which extends through a stepped through-going opening 30 of the latch plate 16 and also through a through-going opening 32 coaxial thereto of a circuit board 34 which is fixedly connected to the latch plate 16.

A rotary knob 36, in particular intended for manual actuation, is releasably secured to the free end of rotary spigot 28 and its end face confronting the circuit board 34 forms an abutment 38 which is acted on by a compression spring 18 arranged between this abutment 38 and the latch plate 16. In this respect, the compression spring 18 is mounted on the rotary spigot 28 and is braced at its end at the latch plate side against a ring step 41 of the stepped through-going opening 30 of the latch plate 16.

As can be recognised from FIG. 1 the outer diameter of the rotary spigot 28 can be smaller than the smaller diameter of the upper section of the stepped bore 30 of the latch plate 16. Through the three-point mounting a precisely defined position and alignment of the base plate 14 carrying the deflecting mirror 12 is nevertheless always achieved. A contact spring 40 is rotationally fixedly mounted on the rotary knob 36 and is held via inside contacts 42 against the side of the circuit board 34 remote from the latch plate 16, in order to be able to tap off a signal representative for the respective latched position of the base plate 14. For this purpose the circuit board is appropriately contacted at the relevant side.

These deflecting mirrors 12 are respectively secured to the base plate 14 via a flexible sheet metal holder 44 in order to be able to adjust the position of the deflecting mirrors 12 relative to the base plate 14 for the respective adjustment in the beam path of the laser beam LS. In the present case a one piece sheet metal element is provided which is secured via rivets 46 to the base plate 14 and includes correspondingly cut out sections which are bent up through substantially 90° and form the sheet metal holders 44.

The sheet metal holders 44, or the one piece sheet metal element which includes the latter, consists in the present case of a soft material, such as in particular aluminium. A respective adjustment or setting of the deflecting mirrors 12 accordingly takes place by corresponding bending of the relevant sheet metal holders 44. The deflecting mirrors 12 can then be secured in the respectively set position by a removable fixing plate 48 (see FIG. 1).

In accordance with FIG. 1 this fixing plate 48 can be secured to a shaft section 50 which has a spigot 52 which is for example formed as a polygonal spigot and which engages into a corresponding through-going opening 54 in the base plate 14 and in the rotary spigot 28.

Moreover, the rotary knob 36 is also provided with such a mounting spigot 56. This mounting spigot 56 associated with the rotary knob 36, and which is for example in turn formed as a polygonal spigot, engages from the other side into the correspondingly shaped recess 54. Thus, the shaft section 50 and also the rotary knob 36 are rotationally fixedly connected to the base plate 14.

Figure 2:
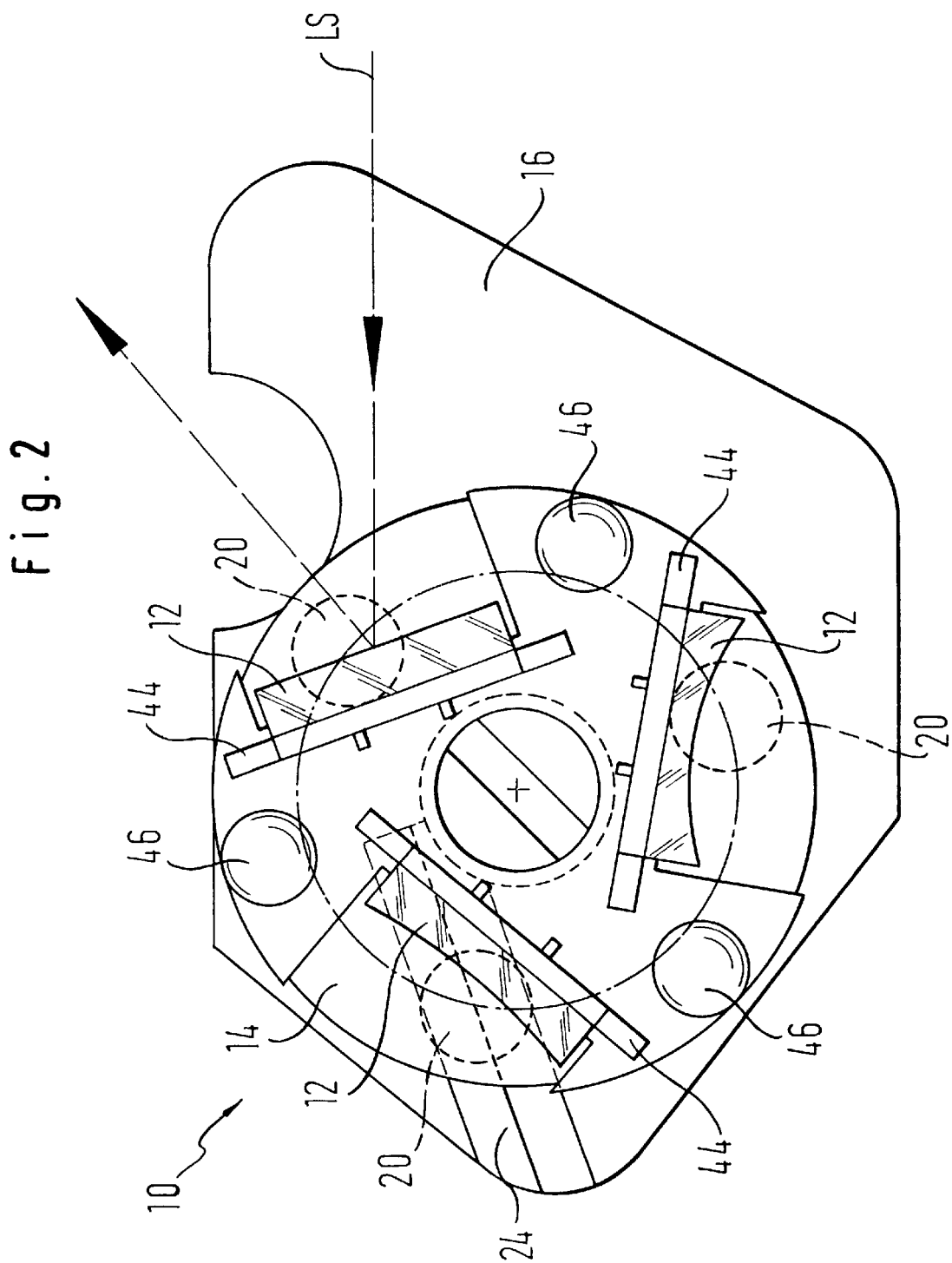

As can best be seen from FIG. 2 the ball-segment-like projections 20 which are respectively mutually displaced by 120° have the same dimensions.

As can be seen from FIG. 3 in particular, the wedge-shaped groove 24 extends along a straight line 58 parallel to the plane of the latch plate 16 which extends through the center point of the entry cross-section of the conical bore 22 and intersects a further straight line 60 parallel to the plane of the latch plate 16 at a right angle, with the further parallel straight line 60 extending through the center point of the entry cross-section of the truncated cone-like bore 26 and the axis of rotation A.

As can be recognised with respect to FIGS. 4 to 6, the conical bore 22 and the wedge-shaped groove 24 have the same depth. Moreover, the flanks of the wedge-shaped groove 24 have the same steepness as the peripheral wall of the conical bore.

The entry cross-section of the truncated cone-like bore 26 forming the lower disposed section is larger than that of the conical bore 22. A respective ball-segment-like projection 20 contacts the base of the truncated cone-like bore 26 so that the lower disposed section is formed by the base of this truncated cone-like bore 26. The depth down to this base is somewhat smaller than the depth of the conical bore 22 and also of the conical groove. It is, however, disposed sufficiently deeply that the base plate 14 is aligned in a respective latch position in precisely defined plane and preferably parallel to the latch plate 16.

The peripheral wall of the truncated cone-like bore 26 has the same steepness as the flanks of the wedge-like groove 26 and the peripheral wall of the conical bore 22.

On rotation of the base plate 14 into a respective latched position, a point of rotation is first defined by the conical bore 22 after the engagement of a respective ball-segment-like projection 20 with an assumed floating support. The base plate 14 is pivotable about the point of rotation in a plane essentially parallel to the latch plate 16. Once a respective further projection 20 has engaged into the wedge-like groove 24, the rotary position of the base plate 14 is determined. Once the third ball-segment-like projection 20 of the base plate 14 has finally also come into contact with the floor of the truncated cone-like bore 26 of the latch plate 16 forming the lower disposed section, the base plate 14 is also aligned in a precisely defined plane which is preferably parallel to the plane of the latch plate The base plate 14 is held in the respective latched position by the compression spring 18 by which the base plate 14 is drawn against the latch plate 10. In a respective latched position, the relevant deflecting mirrors 12 can be adjusted, when the laser beam LS is incident thereon, by corresponding bending of the sheet metal holders 44. Thereafter the deflecting mirrors 12 are fixed by the mounting of the fixing plate 48.

Manufacturing tolerances can thus be eliminated without problem. Since the base plate 14 which serves as the mirror carrier is fixed in the respective latched position by the three-point mounting relative to the latch plate 22, all previously effected adjustments of the deflecting mirrors 12 can be reproduced without problem even with a floating mounting of the base plate 14. For this purpose it is simply necessary to rotate the base plate 14 into the respective latched position, in which the deflecting mirror 12 having the desired focal length is then arranged precisely adjusted in the beam path of the laser beam LS.

REFERENCE NUMERAL LIST 10 rotary mirror
12 deflecting mirror
14 base plate
16 latch plate
18 compression spring
20 projection
22 conical bore
24 wedge-shaped groove
26 truncated cone-like bore
28 rotary spigot
30 through-going opening
32 through-going opening
34 circuit board
36 rotary knob
38 abutment
40 contact spring
41 ring step
42 contacts
44 sheet metal holder
46 rivets
48 fixing plate
50 shaft section
52 spigot
54 through-going opening
56 mounting spigot
58 straight line
60 straight line
A axis of rotation
LS laser beam

We claim:

1. Rotary mirror arrangement (10) for the focusing of an incident light beam and/or for the change of the position of the focus of an already focused light beam, in particular laser beam (LS),
characterised in that
a plurality of deflecting mirrors (12) of different focal length are secured on one side of a base plate (14) which is rotatably mounted on a stationary latch plate (16) arranged on the opposite side and can be latched to the latter in various rotational positions, wherein, in a respective latched position, a relevant deflecting mirror (12) is pivoted into the beam path of the incident light beam (LS); in that the base plate (14) is displaceably mounted on the latch plate (16) in the direction of the axis of rotation (A) and is held against the latch plate by spring force (18); and in that the base plate (14) is supported on the latch plate (16) by a three-point mounting.

2. Rotary mirror arrangement in accordance with claim 1, characterized in that
the three-point mounting includes three ball-segment-like projections (20) which cooperate with a conical bore (22), a wedge-shaped groove (24), or a lower disposed section (26) of the latch plate (16) or of the base plate (14), in order to unambiguously and reproducibly fix the base plate (14) in the respective latched position.

3. Rotary mirror arrangement in accordance with claim 2, characterised in that
the ball-segment-like protections (20) which are mutually respectively displaced by 120° have the same dimensions.

4. Rotary mirror arrangement in accordance with claim 2, characterized in that
the conical bore (22) and the wedge-shaped groove (24) have the same depth, and in that the section (26) is disposed with the corresponding depth.

5. Rotary mirror arrangement in accordance with claim 2, characterised in that
the flanks of the wedge-shaped groove (24) have the same steepness as the peripheral wall of the conical bore (22).

6. Rotary mirror arrangement in accordance with claim 2, characterised in that
the lower disposed section of the latch plate is formed by the base of truncated cone-like or cylindrical bore (26), the entry cross-section of which is larger than that of the conical bore (22).

7. Rotary mirror arrangement in accordance with claim 6, characterised in that
the peripheral wall of the truncated cone-like bore (22) has the same steepness as the flanks of the wedge-shaped groove (24) or of the peripheral wall of the conical bore (22).

8. Rotary mirror arrangement in accordance with claim 2, characterised in that
the wedge-shaped groove (24) extends along a straight line (58) parallel to the plane of the latch plate which extends through the central point of the entry cross-section of the conical bore (24) and intersects a further straight line (60) extending to the plane of the latch plate (16) at a right angle, said further parallel straight line (60) extending through the center point of the entry cross-section of the truncated cone-like bore (22) and intersecting the axis of rotation (A).

9. Rotary mirror arrangement in accordance with claim 1, characterised in that
the base plate (14) is provided with a rotary spigot (28) which extends through a through-going opening (30) of the latch plate (16) and has an abutment (38) at the free end on which a compression spring (18) acts which is arranged between this abutment (38) and the latch plate (16).

10. Rotary mirror arrangement in accordance with claim 9, characterised in that
the compression spring (18) is mounted onto the rotary spigot (28) and is braced at its end adjacent the latch plate on a ring step (41) of the through-going opening (30) of the latch plate (16) which is formed as a stepped opening.

11. Rotary mirror arrangement in accordance with claim 9, characterised in that
the abutment (38) is formed by a rotary knob (36) arranged at the free end of the rotary spigot (28) and preferably releasably secured to the latter.

12. Rotary mirror arrangement in accordance with claim 9, characterised in that
a contact spring (40) rotatable with the base plate (14) is arranged in the region of the free end of the rotary spigot (28) or of the abutment (38) and is held against the side of the circuit board (34) remote from the latch plate (16) in order to tap off a signal representative for the respective latch position of the base plate (14).

13. Rotary mirror arrangement in accordance with claim 1, characterised in that
the latch plate (16) is firmly connected at its side remote from the base plate (14) to a circuit board (34) which is provided with a through-going opening (32) coaxial to the through-going opening of the latch plate (16) for the rotary spigot (28) of the base plate (14).

14. Rotary mirror arrangement in accordance with claim 1, characterised in that the deflecting mirrors (12) are adjustable in their position relative to the base plate (14) for an adjustment in the beam path of the light beam (LS).

15. Rotary mirror arrangement in accordance with claim 14, characterized in that the deflecting mirrors (12) are respectively fixed on the base plate via a flexible sheet metal holder (44) of a preferably soft material, such as aluminium, and are fixed in the respectively set position by a removable fixing plate (48).

* * * * *